(12) United States Patent
Poole (10) Patent No.: US 9,944,339 B2
(45) Date of Patent: Apr. 17, 2018

(54) ILLUMINATED BICYCLE

(71) Applicant: Wayne Gerard Poole, Alexandria, VA (US)

(72) Inventor: Wayne Gerard Poole, Alexandria, VA (US)

( * ) Notice: Subject to any disclaimer, the term of this patent is extended or adjusted under 35 U.S.C. 154(b) by 265 days.

(21) Appl. No.: 14/545,720

(22) Filed: Jun. 10, 2015

(65) Prior Publication Data

US 2016/0362154 A1    Dec. 15, 2016

(51) Int. Cl.
*B62J 6/00* (2006.01)
*B62J 3/00* (2006.01)
*B62K 19/40* (2006.01)
*B62J 6/16* (2006.01)

(52) U.S. Cl.
CPC ............ *B62J 6/003* (2013.01); *B62J 3/00* (2013.01); *B62J 6/001* (2013.01); *B62K 19/40* (2013.01); *B62J 6/16* (2013.01)

(58) Field of Classification Search
CPC ......... B62J 6/00; B62J 2006/008; B62J 6/003
USPC ........................................................ 362/473
See application file for complete search history.

(56) References Cited

U.S. PATENT DOCUMENTS

| | | | |
|---|---|---|---|
| 4,319,307 A | 3/1982 | Turner | |
| 4,901,209 A * | 2/1990 | Nitz | B62K 19/16 280/281.1 |
| 5,008,782 A | 4/1991 | Murray | |
| 5,765,936 A | 6/1998 | Walton et al. | |
| 5,823,653 A | 10/1998 | Elam, Jr. et al. | |
| 6,158,881 A | 12/2000 | Carne | |
| 6,336,736 B1 | 1/2002 | Edmond | |
| 6,779,913 B2 | 8/2004 | Niezrecki et al. | |
| 7,997,775 B2 | 8/2011 | Hurwitz | |
| 8,740,433 B2 | 6/2014 | Smith | |
| 8,870,421 B2 | 10/2014 | Ward et al. | |
| 2012/0051072 A1 * | 3/2012 | Yelverton | B62J 6/00 362/473 |
| 2012/0275179 A1 | 11/2012 | Smith | |
| 2013/0138302 A1 * | 5/2013 | Hara | B62J 1/08 701/49 |
| 2014/0354419 A1 * | 12/2014 | Frier | B60R 25/10 340/432 |

* cited by examiner

*Primary Examiner* — Karabi Guharay (57) ABSTRACT

An internally illuminated frame for a bicycle or alternatively, a complete bicycle is disclosed. The bicycle comprises at least one frame tube made from a translucent material and containing individually illuminable lighting elements. The complete bicycle includes a controller operable to control individual ones of the lighting elements, a battery, brake lights, a head piece including a display screen, a user interface, an audio speaker, and optionally, forward facing lighting elements. The controller is programmable to control the lighting elements and the audio speaker from stored programming. Programming may be provided wirelessly or by hard wired connection.

16 Claims, 5 Drawing Sheets

ILLUMINATED BICYCLE

REFERENCE TO RELATED APPLICATION

This application is related to Application Nos. 61/889,412, filed Oct. 10, 2014, and Ser. No. 14/545,405, filed May 1, 2015.

FIELD OF THE DISCLOSURE

The present disclosure relates to internally illuminated bicycles and vehicles by a group of lights under central control.

BACKGROUND

Vehicles such as bicycles may include lighting features for utilitarian purposes related to operating the vehicle, and other lighting features, such as commercial or amusement illuminated displays. Lighting features have been attached to the vehicle chassis or body so as to be visible from outside the vehicle. Lighting features are ordinarily provided with dedicated circuits to operate and control the respective lighting features. There exists a need to make vehicles more conducive to incorporation of lighting features, and to improve operation and control of lighting features.

SUMMARY

The present disclosure therefore proposes internally illuminated vehicles. In bicycles, for example, the frame may be translucent or transparent, and hollow, so that lighting features may be carried within the frame and may be visible from the exterior. Where there are a number of lighting features, particularly both utilitarian lighting such as turn signals, brake lights, running or parking lights, emergency condition indicators, license plate illuminating lights, fog lamps, and headlights, for example, a master controller may be provided to oversee all of these lights. Examples of non-utilitarian lights include lights provided for purely esthetic effects, and commercial advertising and other announcement purposes.

A consequent feature is that lights may be operated for diverse purposes, with some of these being overridden by the master controller to function as utilitarian lights when the need arises. After the need is satisfied, those lights repurposed as utilitarian lights may be extinguished or may revert to their prior function. This relieves the vehicle manufacturer from being obliged to furnish separate lights or lighting assemblies for each purpose. The present disclosure provides for using lighting assemblies fabricated as stock articles, wherein individual lighting elements may, by selective control by the master controller, perform diverse functions. This eliminates the need for dedicated circuits, especially for utilitarian lights. For example, elongated strips bearing light emitting diodes (LEDs) may extend throughout the vehicle, with specific LEDs being selectively illuminated as needed to provide the effect of dedicated lights of prior art vehicles. It then follows that by simple reprogramming of the master controller, a great many changes may be introduced without requiring changing of individual lamps, individual switches, and other components.

BRIEF DESCRIPTION OF THE DRAWINGS

Various objects, features, and attendant advantages of the disclosed concepts will become more fully appreciated as the same becomes better understood when considered in conjunction with the accompanying drawings, in which like reference characters designate the same or similar parts throughout the several views, and wherein.

DETAILED DESCRIPTION

Figure 1:
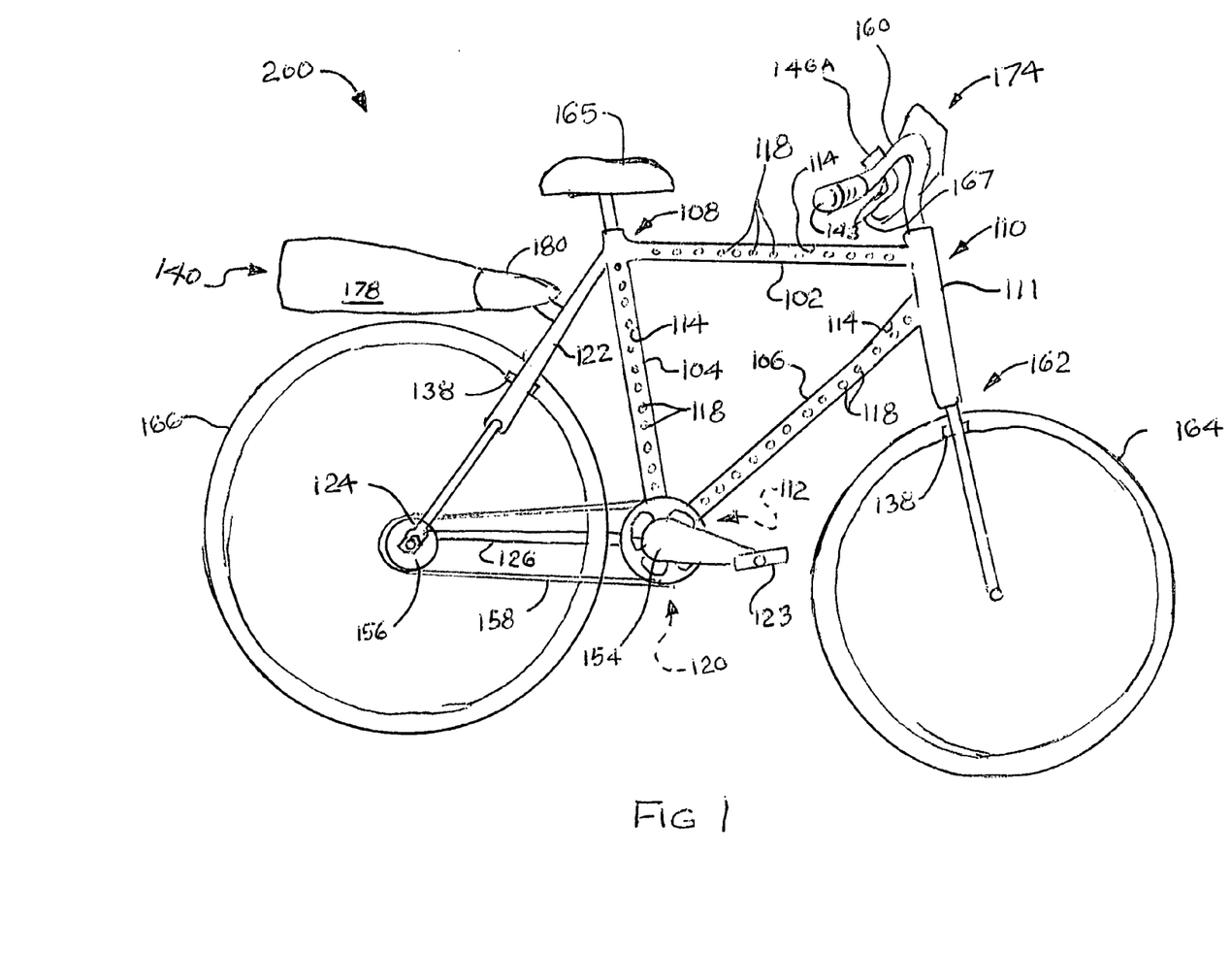
FIG. 1 is a diagrammatic, side view of an illuminated bicycle, according to at least one aspect of the disclosure.

Referring now to FIG. 1, there is shown a bicycle frame 100 for an illuminated bicycle 200, bicycle frame 100 comprising a top tube 102 made from a translucent material, a seat tube 104 made from a translucent material, and a down tube 106 made from a translucent material. A first joint 108 connects top tube 102 to seat tube 104, a second joint 110 connecting top tube 102 to down tube 106, and a third joint 112 connecting down tube 106 to seat tube 104. At least one of top tube 102, seat tube 104, and down tube 106 includes a longitudinal internal passage 114 containing at least one series 116 of lighting elements 118 therein. The at least one series 116 of lighting elements 118 is visible from outside bicycle frame 100. Hence bicycle frame 100 is both structural and also serves as a protective cover for lighting elements 118, enabling light emitted by the latter to be visible from outside bicycle frame 100.

Depending upon fabrication techniques, first, second, and third joints 108, 110, 112 may be discrete components, or alternatively, may be regions where top tube 102, seat tube 104, and down tube 106 intersect one another. In the example of FIG. 1, second joint 110 may comprise a short head tube 111. Where provided, head tube 111 may include longitudinal internal passage 114 and may contain lighting elements 118.

Series 116 of lighting elements may comprise a linear array of lighting elements 118, as would be present if fabrication of bicycle frame 100 uses pre-fabricated strips of lighting elements 118 mounted on an elongated substrate, as will be described hereinafter. Series 116 may refer to one continuous linear array of lighting elements 118, or several short linear arrays of lighting elements 118 appropriately joined in series to one another and to an electrical supply, to be described hereinafter.

Unless otherwise indicated, the terms "first", "second", etc., are used herein merely as labels, and are not intended to impose ordinal, positional, or hierarchical requirements on the times to which these terms refer. Moreover, reference to, e.g., a "second" item does not either require or preclude the existence of, e.g., a "first" or lower-numbered item, and/or, e.g., a "third" or higher-numbered item.

Lighting elements 118 may be active or inactive. Lighting elements 108 are said to be active if they are connected to power and control signals, and can be illuminated to create a lighted display at the discretion of the user. It would be possible to utilize all of the lighting elements 118 as active, or alternatively, to leave at least one lighting element 118 unused. An unused lighting element 118 may serve as a spare, or may activated in the future when desired.

The translucent material of top tube 102, seat tube 104, and down tube 106 may be a polycarbonate plastic, for example. For the purposes of this disclosure, translucency will be understood to encompass transparency. Polycarbonate is one of a number of constituent materials which may be utilized to form the hollow plastic tubing of top tube 102, seat tube 104, and down tube 106. Other materials which may be substituted include other transparent or translucent plastics, such as acrylic plastics. Polycarbonate is readily commercially available, light in weight, readily extruded, strong enough to serve as a suitable material for bicycle frame 100, and is transparent or translucent. Synthetic materials such as polycarbonate may optionally be reinforced with carbon fiber, fiberglass, and other materials.

Figure 2:
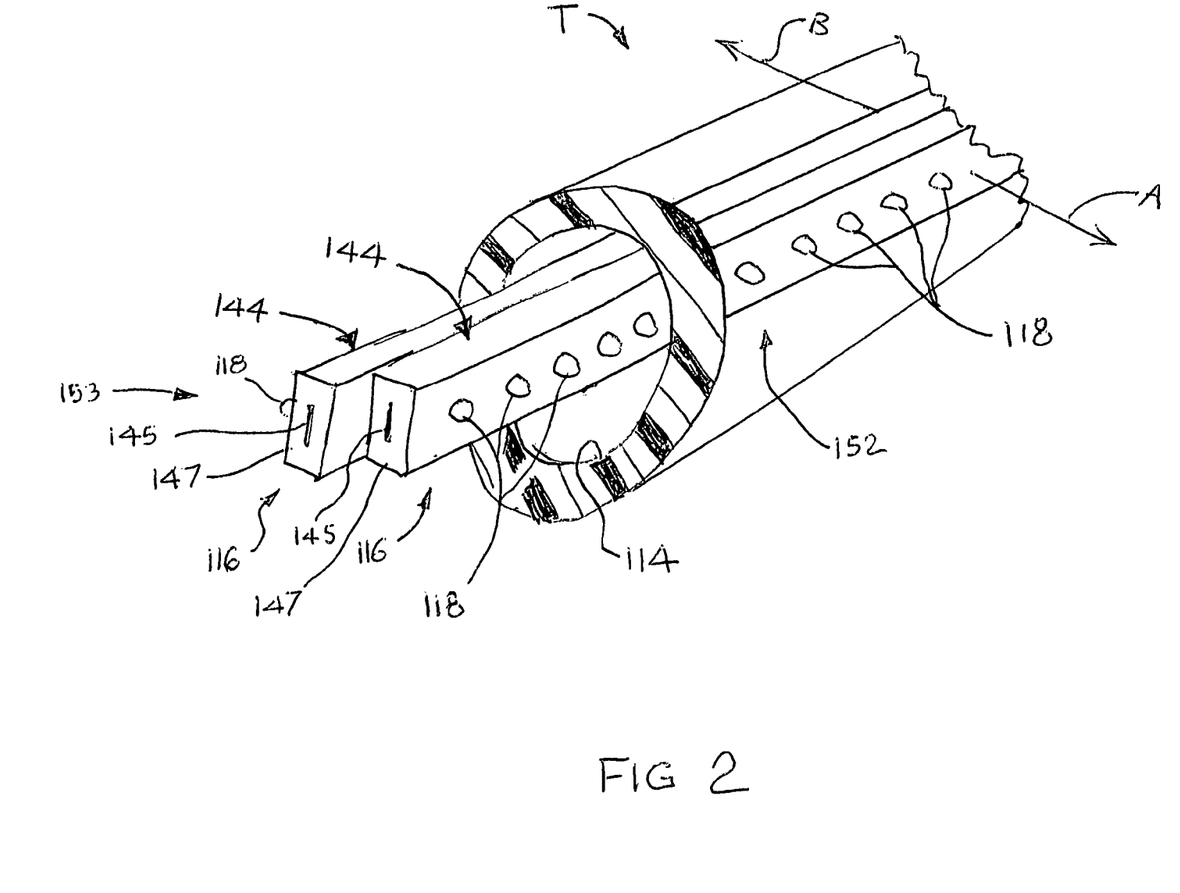
FIG. 2 is an enlarged perspective detail view of tube frame members seen at the upper center of FIG. 1.

Referring also to FIG. 2, which generically shows a tube T which is representative of top tube 102, seat tube 104, and down tube 106, longitudinal internal passage 114 may be circular or non-circular in cross sections along its length. Non-circular cross sections may be used to prevent rotation of a series 116 of lighting elements 118 within top tube 102, seat tube 104, and down tube 106, to increase effective thickness of top tube 102, seat tube 104, and down tube 106, or for other purposes.

At least one of first joint 108, second joint 110, and third joint 112 may be fabricated from a material including carbon fiber. Although metal constituency may be used for first, second, and third joints 108, 110, 112, carbon fiber in a polymeric matrix could be made sufficiently strong for the purpose while reducing weight of illuminated bicycle 200 from that which would result using metal joints.

Third joint 112 may comprise a bottom bracket shell 120. Bicycle frame 100 further comprises at least one seat stay 122 fixed at one end to first joint 108 and terminating in a fork end 124. At least one chain stay 126 is fixed at one end to bottom bracket shell 120 and at an opposed end to fork end 124. Hence bicycle frame 100 supports assembly of those components required to complete a bicycle, such as front and rear wheels 164, 166, pedals 123, and the like.

Figure 3:
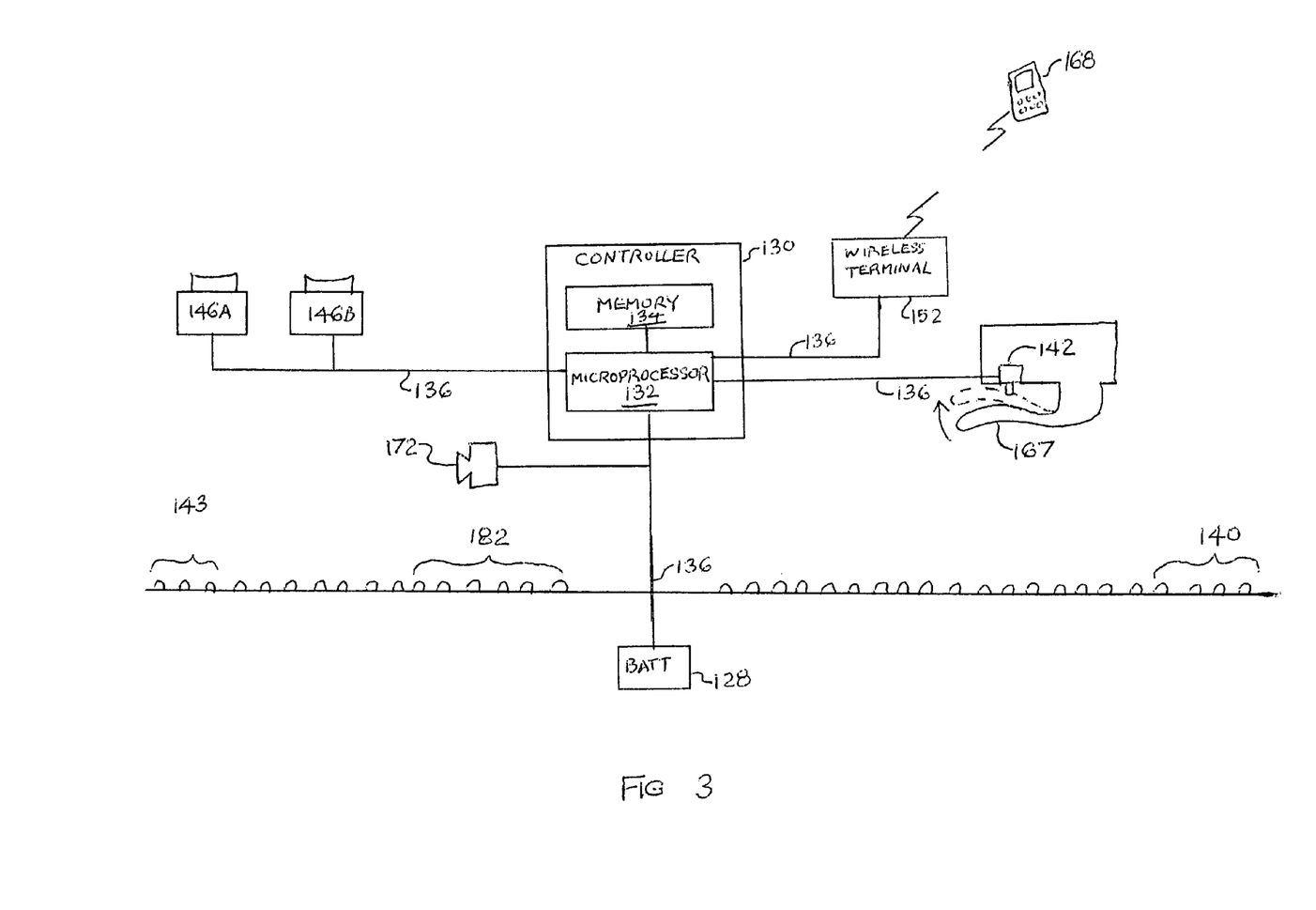
FIG. 3 is a schematic representation of electrical components of the illuminated bicycle of FIG. 1, according to at least one aspect of the disclosure.

Referring also to FIG. 3, illuminated bicycle 200 comprises bicycle frame 100, a battery 128 carried on illuminated bicycle 200, and a controller 130 carried on illuminated bicycle 200. Controller 130 comprises a microprocessor 132, a memory 134, and computer instructions loaded into memory 134 in a non-transitory computer-readable medium that when executed, are configured to instruct microprocessor 132 to selectively control electric power to at least some of the plurality of lighting elements 118. An electrical circuit 136 is electrically connected to battery 128, to controller 130, and to at least some of the plurality of lighting elements 118.

Microprocessor 132 may comprise an electrical microprocessor made for example by Arduino. The microprocessor available from Arduino is an open-source electronics platform based on easy-to-use hardware and software. Arduino is a commercial entity which intends its products for use by those creating projects having interactive features. Commercially available programming products of Arduino may be found online for example at a retailer such as Adafruit Industries (https://www.adafruit.com/products/191). Arduino product Mega 2560 R3 (Atmega 2560, assembled), product number 191, has proved satisfactory in the role of controller 132.

Illuminated bicycle 200 may further comprise manual brakes 138 and at least one brake light 140 (FIG. 3) mounted to bicycle frame 100, wherein electrical circuit 136 is connected to the at least one brake light 140, and brake light 140 illuminates responsive to application of manual brakes 138. As represented in FIG. 3, brake light 140 is not an assembly unto itself. Rather, it comprises predetermined ones of lighting elements 118 which function as brake light 140 as a result of programming of controller 132. When brake lever 168 is moved to apply brakes 138, a brake switch 142 is closed, which sends a signal to microprocessor 132. Responsively, controller 130 sends an operating signal to those lighting elements 118 predetermined to function as brake light 140.

As used herein, reference to an article as being mounted on or to bicycle frame 100 does not necessarily imply direct connection between the article and bicycle frame 100, as an intervening member may be present. Mounting on or to bicycle frame 100 signifies that the article is ultimately fixed to and supported by bicycle frame 100.

The software, or computer instructions loaded into controller 130, is operable to inhibit at least some of the plurality of lighting elements 118 responsive to application of manual brakes 138, while operating the at least one brake light 140. Alternatively stated, the at least one brake light 140 may include some predetermined ones of a much greater number of lighting elements 118, rather than comprising a separate lighting assembly (not shown). Many lighting elements 118 may be statically or dynamically illuminated to produce visual displays. Microprocessor 132 selectively illuminates and extinguishes those lighting elements 118 designated as the at least one brake light 140, and may further inhibit illumination of lighting elements 118 producing the visual displays, to increase conspicuousness of brake light 140. In small vehicles such as illuminated bicycle 200, there may be only one brake light 140. In larger vehicles such as automobiles (not shown), there may be several brake lights 140, such as a right brake light, a left brake light, and a high center mount brake light (none of these is shown) spaced apart from one another but illuminated according to a scheme common to all.

Referring again to FIG. 2, series 116 of lighting elements 118 may be a lighting strip 144 wherein each one of the plurality of lighting elements 118 comprises a multicolor light emitting diode (LED). Lighting strip 144 may may comprise for example LED strip products available from a retailer such as Adafruit Industries, such as NeoPixel digital RGB LED strip, product identification 1461 (https://www.adafruit.com/products/1461). In this type of lighting strip 144, each LED is a three-part LED assembly including one red constituent LED, one green constituent LED, and one blue constituent LED. Each three-part LED assembly is individually addressable because each part of the three is served by a dedicated power conductor contained within and integral to the strip. Selective powering of each of the three results in the three-part LED assembly being multi-color, and independently controllable relative to for example adjacent three-part LED assemblies. Such LEDs may be controlled such that each emits light selectively of different colors. This minimizes the number of LEDs that must be provided. LEDs throughout the entire lighting system may be identical in type, size, luminosity, etc.

Figures 4, 5:
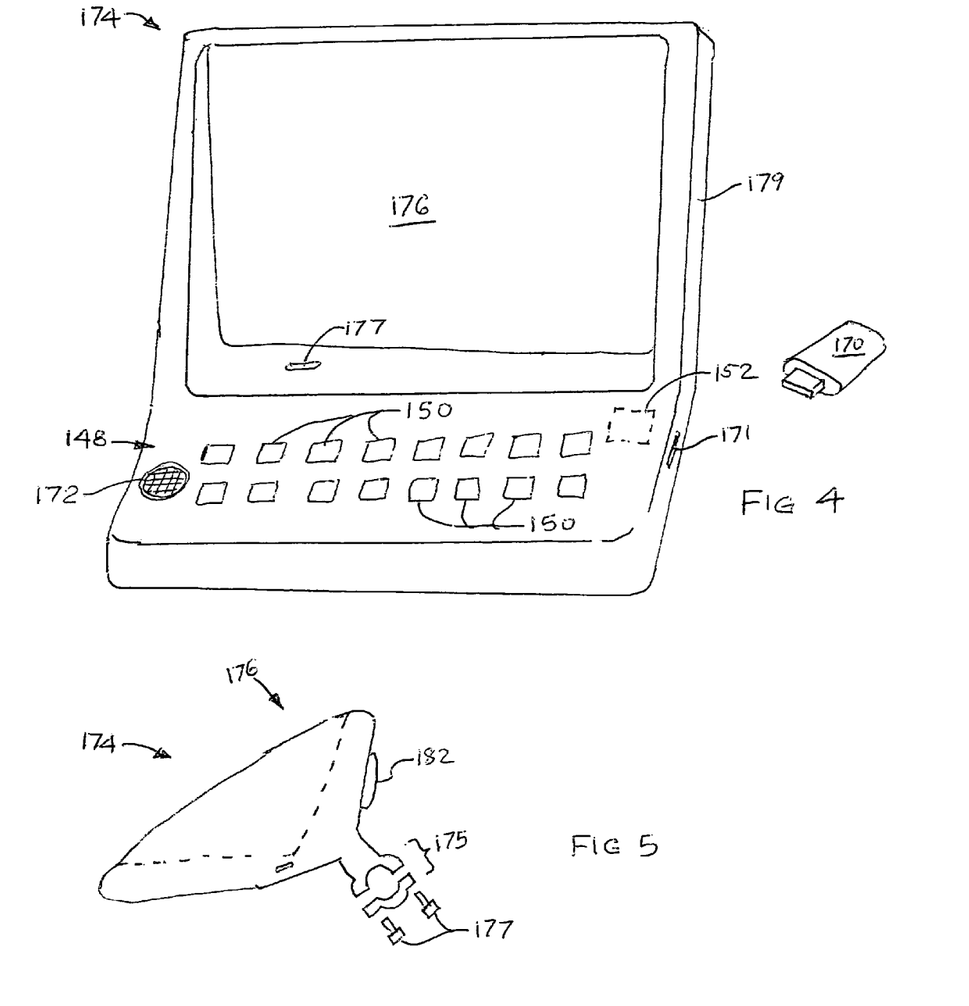
FIG. 4 is an enlarged perspective detail view of an optional member of the illuminated bicycle, seen at the upper right of FIG. 1, according to at least one aspect of the disclosure.
FIG. 5 is a side detail view of the optional member of FIG. 4, according to at least one aspect of the disclosure.

Referring additionally to FIG. 4, illuminated bicycle 200 further comprises a user interface operable to receive commands from a person using illuminated bicycle 200 and to transmit the commands to controller 130 to selectively illuminate first series 116 of active lighting elements 118. The computer instructions are capable of being processed by microprocessor 132 to generate control signals corresponding to the commands received by the user interface. The user interface may be brake switch 142 or a pushbutton 146A or 146B used as a turn signal switch for example, and may control a utilitarian lighting feature. The user interface may be a keyboard 148 communicably connected to microprocessor 132. The latter option may be utilized to select or modify an amusement or commercial advertising display generated by series 116 of lighting elements 118. In the example of FIGS. 4 and 5, the user interface is a head piece 174 which is attachable for example to handle bar 160. The user interface comprises manual keys 150. Of course, a touch screen or other type of user interface device may be provided.

Head piece 174 may include a docking station 176 for receiving e.g. a tablet type computer or a smart phone, and optionally, docking and power connections (e.g., 177) for supporting a mobile communications device such as a cellular telephone (not shown).

In the example of FIG. 5, head piece 174 includes a clamp 175 secured by threaded fasteners 177 to engage handle bar 160. In some realizations of illuminated bicycle 200, head piece 174 is formed integrally with handle bar 160 (this option is not shown).

The user interface may comprise a wireless communications terminal 152 operable to receive wireless signals. This may be used to program or reprogram microprocessor 132 remotely, by downloading programming content to the user interface, and transmitting downloaded content to microprocessor 132. Electrical circuit 136 will be understood to extend to wireless communications terminal 152 and to head piece 174.

Controller 130 may be programmable. Using for example the user interface having manual keys 150, controller 130 may be manually programmable. Controller 130 may be remotely programmable via at least one of a wireless mobile communications device such as a mobile or cellular phone 168 (FIG. 3) or a hard wired electronic device 170 (FIG. 4) having a USB cable or USB cable terminal. A USB port 171 (FIG. 4) is provided as part of controller 130, or, where controller 130 is inaccessible due to location within bicycle frame 100 and as shown in FIG. 4, USB port 171 may be part of head piece 174. A flash drive would serve as the hard wired electronic device 170 as connections are mechanical and do not operate wirelessly.

To utilize series 116 of lighting elements 118 advantageously as a programmable display, the computer instructions are operable to cause microprocessor 132 to selectively illuminate at least some of first series 116 of lighting elements 118 according to at least one pre-established sequence loaded into memory 134. Any of lighting elements 118 may participate in a static or dynamic programmable display, for example, for amusement or commercial purposes.

Referring particularly to FIG. 2, in illuminated bicycle 200, lighting elements 118 comprise a first plurality 152 of lighting elements 118 facing a first radial direction A relative to top tube 102, seat tube 104, or down tube 106, and at least one second plurality 153 of lighting elements 118 facing a second radial direction B different from the first radial direction A. Electric circuit 136 is electrically connected to first plurality 152 of lighting elements 118 and to second plurality 153 of lighting elements 118.

In FIG. 2, two lighting strips 144 are arranged back to back, so that their respective lighting elements 118 (LEDs) face in opposed directions A and B. Power and data bus 145 are contained within and integral to support strata 147 of lighting strips 144.

The first and second radial directions are radial relative to a longitudinal center line (not shown) of each of top tube 102, seat tube 104, and down tube 106. In this way, light emitted from first series 152 of lighting elements 118 can be readily seen from one side of illuminated bicycle 200, and light emitted from second plurality 153 of lighting elements 118 can be readily seen from another side of illuminated bicycle 200.

Referring principally to FIG. 1, illuminated bicycle 200 optionally further comprises bottom bracket 120, at least one seat stay 122 fixed at one end to first joint 108 and terminating in fork end 124, the at least one chain stay 126 fixed at one end to bottom bracket shell 120 and at the opposed end to fork end 124, a crankset 154 mounted to bicycle frame 100 at third joint 112, a rear hub 156 removably mounted to the at least one seat stay 122 at the fork end, and a chain 158 mounted to and spanning crankset 154 and rear hub 156. Illuminated bicycle 200 further comprises handle bar 160 mounted to second joint 110, a front fork 162 rotatably coupled to second joint 110, front wheel 164 rotatably mounted to front fork 162, and rear wheel 166 mounted to rear hub 156. Brake levers 167 (only one brake lever 167 is visible in FIGS. 1 and 3) are mounted to illuminated bicycle 200 and operable to apply manual brake 138. A seat 165 is removably coupled to first joint 108.

Illuminated bicycle 200 may have audio capability. To this end, illuminated bicycle 200 may further comprise at least one speaker 172 (FIGS. 3 and 4) mounted thereto. The at least one speaker 172 is connected to battery 128 and to controller 130 by electrical circuit 136. Controller 130 is operable to send audio signals to the at least one speaker 172.

Illuminated bicycle 200 may further comprise head piece 174 coupled to bicycle frame 100 and communicably connected to controller 130, head piece 174 including display screen 176 controllable by controller 130. Head piece 174 includes a housing 179 for supporting display screen 176 and containing supporting electronics, circuitry, and other components which may be desirable to locate within easy view by a person riding illuminated bicycle 200. Head piece 174 may be mounted to handle bar 160. This is a suitable location for lighting elements 118 operated as a headlight 182 (FIG. 5). Lighting elements 118 operated as turn signals, in addition to or in place of turn signals at the rear of illuminated bicycle 200 may be provided on head piece 174. Headlight uses lighting elements 118 emitting white light.

The at least one speaker 172 may be mounted to head piece 174 and connected to battery 128 and to controller 130 by electrical circuit 136, whereby controller 130 is operable to send audio signals to the at least one speaker 172.

Referring to FIG. 1, illuminated bicycle 200 may further comprise a tail piece 178 including a housing 180 coupled to bicycle frame 100. Tail piece 178 includes at least one lighting element 118 connected by electrical circuit 136 to battery 128 and to controller 130. The at least one lighting element 118 of tail piece 178 may be used as brake light 140 or as a turn signal lamp 143 (FIG. 3) for example. Location of tail piece 178 behind first joint 108 is suitable for brake and turn signal lamps 140, 143. Battery 128 may be contained within tailpiece 178.

Figure 6:
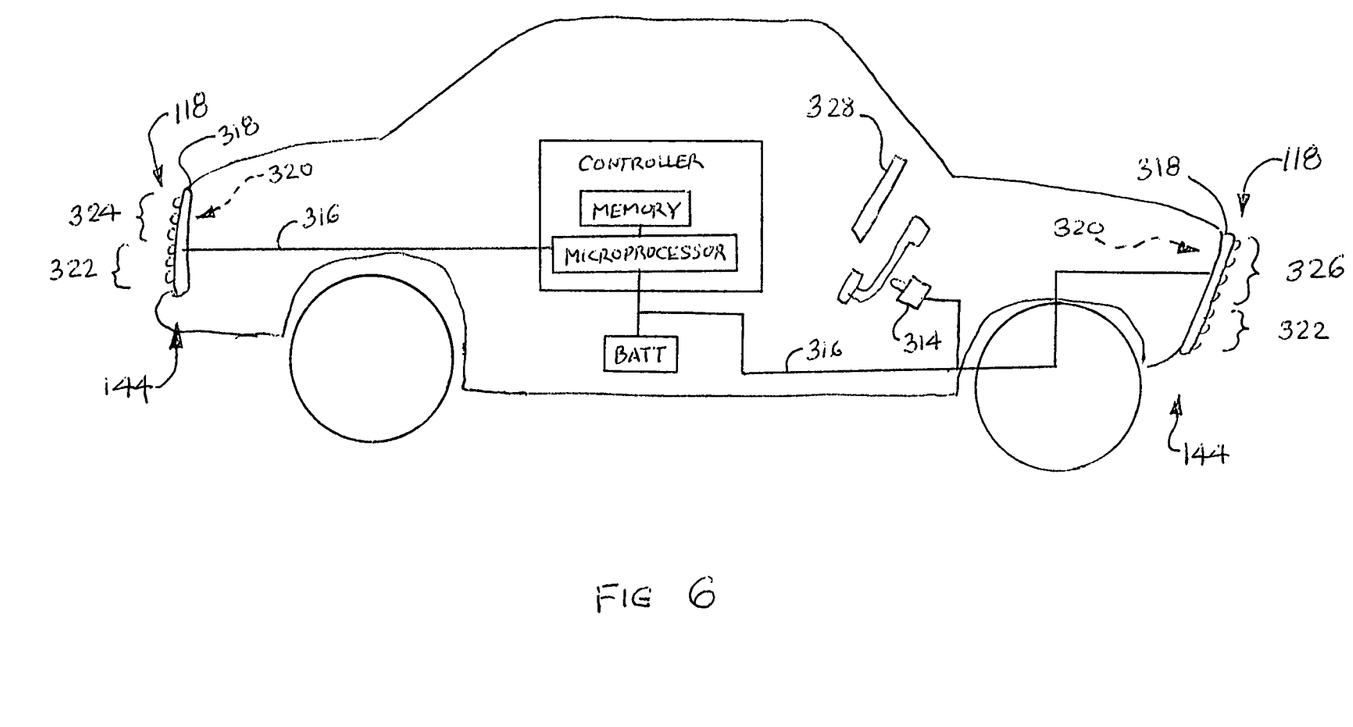
FIG. 6 is a diagrammatic side view of an illuminated vehicle, according to at least one aspect of the disclosure.

Turning now to FIG. 6, there is shown an integrated illumination system 300 for a vehicle 302, comprising a chassis 304, a battery 306 carried on chassis 304, a plurality of lighting elements 118 carried on chassis 304 such that illumination from lighting elements 118 is visible from the exterior of vehicle 302, a controller 308 carried on vehicle 302, controller 308 comprising a microprocessor 310, a memory 312, and computer instructions loaded into memory 312 in a non-transitory computer-readable medium that when executed, are configured to instruct microprocessor 310 to selectively control electric power to individual ones of the plurality of lighting elements 118, and an electrical circuit 316 electrically connected to battery 306, to controller 308, and to the plurality of lighting elements 118. All of the lighting elements 118 the illumination from which is visible from the exterior of vehicle 302 are controlled directly from controller 308. Control directly from controller, 308 does not necessarily imply that all control commands originate from programming within controller 308. In the case of manually actuated utilitarian lighting for example, such as brake lights and turn signals, respective manual switches such as brake light switch 142 (FIG. 3) and a turn signal switch 146A or 146B generate input signals which are received and processed by microprocessor 310 to generate corresponding control signals to individual ones of lighting elements 118.

As used herein, reference to an article as being mounted on or to chassis 304, or carried on chassis 304 does not necessarily imply direct connection between the article and chassis 304, as an intervening member may be present. Mounting on or to chassis 304, or being carried on chassis 304 signifies that the article is ultimately fixed to and supported by chassis 304.

Reference to manual switches, such as brake light switch 142, signifies that the switch is mechanically actuated by an action undertaken by a human operator, and does not necessarily imply direct contact by hand.

The computer instructions cause controller 130 to cause illumination of some predetermined ones of the lighting elements 118 to function as utilitarian lights and to operate in a color and constancy mode which is never invoked by controller 130 unless at least one manual switch 314 (or brake light switch 142, FIG. 3) is operated by an operator of vehicle 302.

Vehicle 302 could be illuminated bicycle 200, wherein chassis 304 is provided by bicycle frame 100; battery 306 is provided by battery 128; controller 308 is provided by controller 130; microprocessor 310 is provided by microprocessor 132; memory 312 is provided by memory 134, and manual switch 314 is provided as brake switch 142 or pushbutton 146. Vehicle 302 includes an electrical circuit 316 controlling lighting elements 118 and connecting lighting elements 118 to power from battery 306. Electrical circuit 306 of vehicle corresponds to electrical circuit 136 of illuminated bicycle 200. Of course, vehicle 302 could be an automobile, motorcycle, three wheeled powered vehicle, all-terrain vehicle, truck, bus, tractor, railway car, mobile powered construction and farming equipment, boat, ship, aircraft, forklift, amusement ride, and may take still other forms.

In integrated illumination system 300, the plurality of lighting elements 118 are all similar in illumination type. Electric circuit 316 further comprises at least one support stratum 318 (similar to support stratum 147) on which lighting elements 118 are mounted, and further comprises power and control conductors 320 (similar to power and data bus 145 in FIG. 2) serving and controlling each one of the plurality of lighting elements 118 individually. Power and control conductors 320 are integral with the at least one support stratum 318. This enables lighting elements 118 to be furnished as a prefabricated stock article, such as lighting strip 144, which may be incorporated into vehicle 302 with minimal further assembly steps.

Similarity in illumination type of lighting elements 118 signifies that all are LEDs (or all incandescent lamps, or all neon lamps).

Integrated illumination system 300 may further comprise at least one manual switch 314 mounted on chassis 304, wherein the at least one manual switch 314 provides an input to controller 308. The computer instructions cause controller 308 to cause illumination of predetermined ones of lighting elements 118 to function as utilitarian lights and to operate in a color and constancy mode which is never invoked by controller 308 unless the at least one manual switch 314 is operated by an operator of vehicle 302. This enables predetermined ones of lighting elements 118 to operate consistently as utilitarian lights associated with vehicle operation, such as brake lights and turn signals.

In integrated illumination system 300, lighting elements 118 functioning as utilitarian lights may function as turn signal lights 322. The color of the color and constancy mode controlling turn signal lights 322 includes one color which is always used for the turn signals. The constancy of the color and constancy mode is a blinking pattern which operates only while at least one of the at least one manual switch 314 is operated by the operator of vehicle 300. This enables predetermined ones of lighting elements 118 to operate consistently as turn signals.

In integrated illumination system 300, the computer instructions may operate lighting elements 118 functioning as turn signal lights 322 as a default condition. This allows for immediate use of turn signal lighting, but allows for changes due to reprogramming, where desired.

In integrated illumination system 300, lighting elements 118 functioning as utilitarian lights function as brake lights 324. The color of the color and constancy mode controlling brake lights 324 includes one color which is always used for brake lights 324. The constancy of the color and constancy mode is a continuously on pattern as long as at least one of the at least one manual switch 314 is operated, and is not on in the one color always used for brake lights 324 when the at least one of the at least one manual switch 314 is not operated. This enables certain predetermined ones of lighting elements 118 to be available as brake lights 324 and to function unambiguously in that role.

In integrated illumination system 300, the computer instructions operate lighting elements 118 functioning as brake lights 324 as a default condition. This allows for immediate provision of brake lights 324, but allows for changes due to reprogramming, where desired.

In a vehicle 302 including integrated illumination system 300, some of lighting elements 118 face forwardly from chassis 304 to function as a headlight 326. The computer instructions cause lighting elements 118 functioning as headlight 326 to be illuminated in white light at all times when integrated illumination system 300 is being operated. This enables the function of headlight 326 to be performed using a lighting strip 144 wherein no dedicated headlamp is required. As depicted in FIG. 6, a single lighting strip 144 can be used for different lighting purposes, with control by controller 308 determining which individual lighting elements 118 are associated with which function. Hence dedicated or separate lighting assemblies are not necessary.

In integrated illumination system 300, the computer instructions operate lighting elements 118 functioning as headlight 326 as a default condition. This allows for immediate use of head lamp 326, but allows for changes due to reprogramming, where desired.

In integrated illumination system 300, lighting elements 118 are all similar in illumination type and comprise a support stratum 318 further comprising power and control conductors 320 of electrical circuit 316 serving and controlling each one of the plurality of lighting elements 118 individually. This enables lighting elements 118 to be furnished as a prefabricated stock article, such as lighting strip 144, which may be incorporated into vehicle 302 with minimal further assembly steps.

Similarity in illumination type of lighting elements 118 signifies that all are LEDs (or e.g. all incandescent lamps, or all neon lamps).

Pushbuttons 146A, 146B may have plural functionalities. That is, in integrated illumination system 300, at least one manual switch 314 has a first functionality when operated by itself, and a second functionality when operated in conjunction with another manual switch 314. For example, one pushbutton 146A or 146B operated by itself functions as a turn signal. However, depressing one pushbutton 146A or 146B continuously while momentarily depressing the other pushbutton 146B or 146A may initiate a different function. For example, operating both pushbuttons 146A, 146B simultaneously may cause options to be displayed on screen 176. This greatly expands functionality of switches, enabling a reduction in the number of switches necessary, or alternatively, increasing functions with the same number of switches.

In integrated illumination system 300, at least one manual switch 314 displays toggle logic when operated by itself. That is, a first operation of at least one manual switch 314 initiates a function, such as operating brake light 324. A subsequent operation of the same manual switch 314 discontinues the performing function. This permits the use of pushbuttons, as opposed to levers which must be moved from a first position to a second position to initiate a function, and back to the first position to discontinue the initiated function. Pushbuttons are more compact than lever type switch operators.

In integrated illumination system 300, at least one manual switch 314, when operated simultaneously with operating another manual switch 314, changes a first lighting pattern being performed on the plurality of lighting elements 118 to a second lighting pattern different from the first lighting pattern. A different lighting pattern or functionality may be invoked without requiring additional switches. A lighting pattern is a predetermined sequence of illumination or extinguishment of each one of the lighting elements 118. Lighting patterns may be static, wherein the illuminated state of each lighting element 118 remains unchanged, or may be dynamic, wherein the illuminated state of at least one lighting element 118 is frequently changed. Static lighting patterns may present a monochromatic display to observers, or may present complex combinations of colors or illumination and non-illumination of lighting elements 118, e.g., to form images, messages, and the like. Dynamic lighting patterns may display movable text, may depict motion, may reproduce abstract changing color effects, and the like.

In the integrated illumination system 300, one default lighting pattern performed by operation of the at least one manual switch (which in this case would be a turn signal switch such as switches 146A, 146B of FIG. 1) is a turn signal pattern wherein one invariable predetermined color is displayed in a blinking sequence. This enables the switch or switches to be conveniently used for the conventional practice of signaling turns.

The integrated illumination system 300 may further comprise a personal display 328 controllable by controller 308. At least one manual switch (e.g., switches 146A, 146B, or 314) operating lighting elements 118 has a second functionality controlling personal display 328 when the at least one manual switch (e.g., switches 146A, 146B, or 314) is operated in conjunction with another manual switch (e.g., switches 146A, 146B, or 314). Personal display 328 is sized and positioned to be observed by a human operator of vehicle 302. By contrast, displays generated by lighting elements 118, visible from outside vehicle 302, are intended for observation by bystanders not in vehicle 302. Operating personal display 328 puts information within convenient reach of the human operator of vehicle 302, and is readily manipulated to exploit selections available from personal display 328.

In integrated illumination system 300, the second functionality of the at least one manual switch (e.g., switches 146A, 146B, or 314) operating lighting elements 118 is to enable selection of a different lighting pattern. Lighting patterns may for example be changed from those intended for amusement or advertising to a lighting pattern pertaining to operation of vehicle 302. For example, a relative inconspicuous lighting pattern may be terminated in favor of a lighting pattern that renders vehicle 302 more easily discernible to surrounding motorists, as a safety measure.

In the integrated illumination system 300, vehicle 302 may further comprise a speaker (e.g., speaker 172) operably connected to controller 308 and battery 306 by electrical circuit 316. At least one manual switch (e.g., switches 146A, 146B, or 314) operating lighting elements 118 has a second functionality controlling speaker 172 when the at least one manual switch (e.g., switches 146A, 146B, or 314) is operated in conjunction with another manual switch (e.g., switches 146A, 146B, or 314). By this expedient, switches having functionalities related to lighting elements 118 may be used to control an audio system.

In integrated illumination system 300, an optional second functionality of the at least one manual switch (e.g., switches 146A, 146B, or 314) operating lighting elements 118 is to enable selection of different audio content.

Integrated illumination system 300 may include any of the apparatus and functionalities of bicycle frame 100, regardless of whether these are explicitly described.

In integrated illumination system 300, the plurality of lighting elements 118 comprise a lighting strip 144 including individually addressable LEDs and dedicated power conductors contained within and integral with lighting strip 144. This minimizes the number of LEDs which must be provided to attain any given level of resolution, and also minimizes the number and ampacity of supporting electrical conductors in electrical circuit 316.

In integrated illumination system 300, each individually addressable LED is a three-part LED assembly including one red constituent LED, one green constituent LED, and one blue constituent LED. This enables a wide range of colors to be available from a minimal number of constituent LEDs, merely by controlling proportions of red, green, and blue illumination available from the three-part LED assembly.

In illuminated bicycle 200 and integrated illumination system 300, it is not necessary that lighting elements 118 be linearly arrayed, as occurs with the lighting strip 144. Any layout of lighting elements 118 may be controlled and operated as described herein.

Electrical circuit 136 or 316 is contained within its supporting substrate (e.g., support stratum 318). Electrical circuits 136 and 316 are shown only schematically in some views herein, and will be understood to include individual conductors in numbers and sizes necessary to accomplish the described functions. Also, electrical insulation and resistors and other electronic control components (none shown) are enclosed within or otherwise made integrally with the assembly. Electrical circuit 136 or 316 carries both operating electrical power and also control signals controlling illumination of each lighting element 118.

Power and control signals may comprise different signals or electrical currents, or alternatively, may be the same. That is, turning power pulses on and off may be utilized both to power the active lighting elements 108 and also to control when the lighting elements 108 are illuminated.

Switch operators may differ from those shown and described herein. For example, rather than pushbuttons 146A, 146B, switches may use touchscreen control, levers, rotated or twisted operators, voice command control, and other control schemes.

While the disclosed concepts have been described in connection with what is considered the most practical and preferred implementation, it is to be understood that the disclosed concepts are not to be limited to the disclosed arrangements, but are intended to cover various arrangements which are included within the spirit and scope of the broadest possible interpretation of the appended claims so as to encompass all modifications and equivalent arrangements which are possible.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

I claim:

1. An illuminated bicycle comprising:
a frame including bicycle frame including a top tube made from a translucent material, a seat tube made from a translucent material, a down tube made from a translucent material, a first joint connecting the top tube to the seat tube, a second joint connecting the top tube to the down tube, and a third joint connecting the down tube to the seat tube; wherein at least one of the top tube, the seat tube, and the down tube includes a longitudinal internal passage containing at least one series of lighting elements therein, the at least one series of lighting elements visible from outside the bicycle frame
a battery carried on the bicycle;
manual brakes;
at least one brake light mounted to the frame, wherein the electrical circuit is connected to the at least one brake light, and the brake light illuminates responsive to application of the manual brakes;
a controller carried on the bicycle, the controller comprising a microprocessor including software loaded into the controller, the software operable to inhibit at least some of the plurality of lighting elements responsive to application of manual brakes while operating the at least one brake light, a memory, and computer instructions loaded into the memory in a non-transitory computer-readable medium that when executed, are configured to instruct the microprocessor to selectively control electric power to at least some of the plurality of lighting elements; and
an electrical circuit electrically connected to the battery, to the controller, and to the at least some of the plurality of lighting elements.

2. The illuminated bicycle of claim 1, wherein each one of the plurality of lighting elements comprises a multicolor light emitting diode.

3. The illuminated bicycle of claim 1, further comprising a user interface operable to receive commands from a person using the illuminated bicycle and to transmit the commands to the controller to selectively illuminate the first series of active lighting elements, and wherein the computer instructions are capable of being processed by the microprocessor to generate control signals corresponding to the commands received by the user interface.

4. The illuminated bicycle of claim 3, wherein the user interface comprises manual keys.

5. The illuminated bicycle of claim 3, wherein the user interface comprises a wireless communications terminal operable to receive wireless signals.

6. The illuminated bicycle of claim 1, wherein the computer instructions are operable to cause the microprocessor to selectively illuminate at least some of the first series of lighting elements according to at least one pre-established sequence, loaded into the memory.

7. The illuminated bicycle of claim 1, wherein, within at least one of the top tube, the seat tube, and the down tube, the lighting elements comprise at least one first plurality of lighting elements facing a first radial direction relative to the top tube, the seat tube, or the down tube, and at least one second plurality of lighting elements facing a second radial direction different from the first radial direction, and wherein the electric circuit is electrically connected to the first plurality of lighting elements and the second plurality of lighting elements.

8. The illuminated bicycle of claim 1, further comprising:
a bottom bracket shell, at least one seat stay fixed at one end to the first joint and terminating in a fork end, and at least one chain stay fixed at one end to the bottom bracket shell and at an opposed end to the fork end;
a crankset mounted to the frame at the third joint, a rear hub removably mounted to the at least one seat stay at the fork end, and a chain mounted to and spanning the crankset and the rear hub;
a handle bar mounted to the second joint;
a front fork rotatably coupled to the second joint, a front wheel rotatably mounted to the front fork, and a rear wheel mounted to the rear hub;
brake levers mounted to the illuminated bicycle and operable to apply the manual brake; and
a seat removably coupled to the first joint.

9. The illuminated bicycle of claim 1, wherein the controller is programmable.

10. The illuminated bicycle of claim 9, wherein the controller is manually programmable.

11. The illuminated bicycle of claim 9, wherein the controller is programmable via at least one of a wireless mobile communications device or a hard wired electronic device having a USB cable.

12. The illuminated bicycle of claim 1, further comprising at least one speaker mounted thereto, the at least one speaker connected to the battery and to the controller by the electrical circuit, and wherein the controller is operable to send audio signals to the at least one speaker.

13. The illuminated bicycle of claim 1, further comprising a head piece coupled to the bicycle frame, the head piece including a display screen controllable by the controller.

14. The illuminated bicycle of claim 13, further comprising at least one speaker mounted to the head piece, the at least one speaker connected to the battery and to the controller by the electrical circuit, and wherein the controller is operable to send audio signals to the at least one speaker.

15. The illuminated bicycle of claim 1, further comprising a tail piece including a housing coupled to the bicycle frame, the tail piece including at least one lighting element connected by the electrical circuit to the battery and to the controller.

16. The illuminated bicycle of claim 1, wherein at least one of the first joint, the second joint, and the third joint is fabricated from a material including carbon fiber.

\* \* \* \* \*